Oct. 28, 1947.   W. F. HOISINGTON   2,429,623
PULSE DISTANCE MEASURING SYSTEM
Filed Sept. 14, 1942   2 Sheets-Sheet 1

INVENTOR
WILLIAM F. HOISINGTON
BY
ATTORNEY

Oct. 28, 1947.  W. F. HOISINGTON  2,429,623
PULSE DISTANCE MEASURING SYSTEM
Filed Sept. 14, 1942  2 Sheets-Sheet 2

INVENTOR
WILLIAM F. HOISINGTON
BY  R. P. Morris
ATTORNEY

Patented Oct. 28, 1947

2,429,623

UNITED STATES PATENT OFFICE 2,429,623

PULSE DISTANCE MEASURING SYSTEM

William F. Hoisington, Rye, N. Y., assignor to Federal Telephone and Radio Corporation, a corporation of Delaware Application September 14, 1942, Serial No. 458,257

10 Claims. (Cl. 250—1.66)

1

This invention relates to a measuring system and is particularly adaptable for use in measuring the distance of objects by reflected signals.

An object of this invention is the provision of an improved simplified radio object detecting and distance measuring system.

Another object of this invention is the provision of a simplified direct reading system for indicating the distance of an object from a station transmitting pulses and receiving signals reflected from the object.

A further object of this invention is the provision of a novel system for sensitizing a receiver, a controllable predetermined time after the generation of a pulse.

A still further object of this invention lies in the provision of a novel system for measuring the elapsed time between the generation of a pulse and the reception of said pulse in the form of an audible signal, the elapsed time in the case of the reception of the pulse as a signal reflected from an object being a measure of the distance of the object from the transmitting and receiving station.

These and other objects and advantages of the invention will become apparent from a study of a preferred embodiment of my invention, described below and illustrated in the accompanying drawings, in which.

Figure 1:
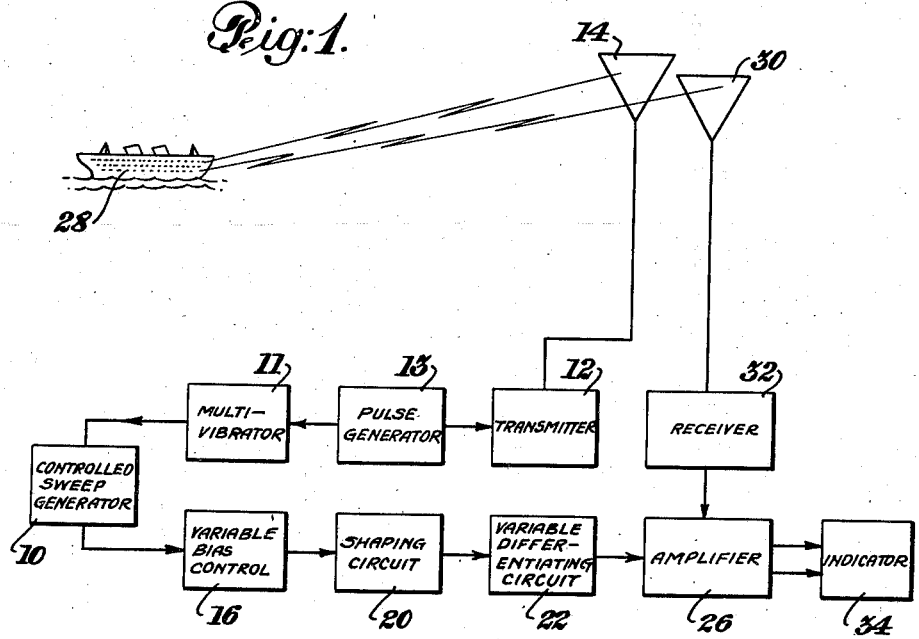
Fig. 1 is a block circuit diagram illustrating the general arrangement of the system according to my invention.

Referring to Fig. 1 of the drawings, I have indicated a controlled sweep generator 10 which is actuated by some well-known type of multivibrator 11. The latter, in turn, is synchronized by a suitable pulse generator 13, transmitting pulses through radio transmitter 12 which radiates energy by the antenna 14. Said sweep generator 10 acts on a variable bias control circuit 16. The output of the variable bias control circuit 16 is preferably applied to a shaping circuit 20. The output from the shaping circuit may then be differentiated by a variable differentiating circuit 22 to unblock an audio amplifier 26 for a desired period.

2

Pulses radiated from antenna 14 will be reflected by an obstacle 28 to antenna 30, located at the same point as antenna 14. The reflected signal received by antenna 30 may be applied to a receiver 32 which will be continuously receptive to reflected energy within a predetermined range. The signal appearing in the output of receiver 32 may or may not pass through audio amplifier 26 to indicator 34, depending on whether or not the audio amplifier 26 is unblocked.

Figure 2:
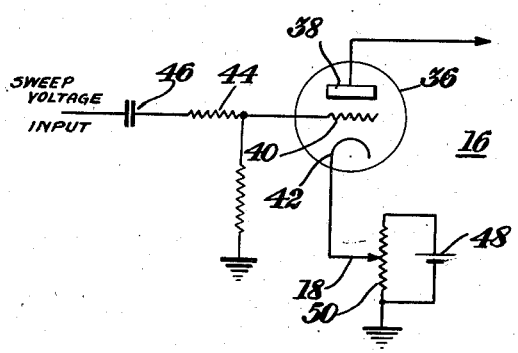
Fig. 2 is a circuit diagram of a bias control circuit used in connection with the present invention.

Fig. 2 illustrates a preferred arrangement of the bias control circuit 16 illustrated in Fig. 1. This circuit will preferably include a tube 36 having an anode 38, a grid 40 and a cathode 42. The input lead to the grid 40 will preferably include a suitable high resistance 44 and a coupling condenser 46. Bias voltage is applied by a potential source such as a battery 48, across which is connected a potentiometer 50 which may be adjusted by an operating arm 18. The tube and circuit constants are so chosen that when the tube becomes conductive it will quickly reach saturation and produce a voltage wave of constant amplitude. The detailed operation of this bias control circuit and its relationship to the remainder of the system will be more explicitly discussed hereinafter.

Figure 3:
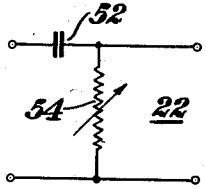
Fig. 3 is a circuit diagram of a differentiating circuit which is employed in the preferred embodiment of my invention.

The differentiating circuit 22 illustrated in Fig. 3 may be of more or less conventional design and will preferably consist of a series condenser 52 and a variable shunt resistor 54.

The remaining elements of the system illustrated in Fig. 1 may be formed of conventional and well-known parts. For a purpose to be explained hereinafter, the sweep generator 10 is preferably designed to provide a choice of at least two sweeps. The shaping circuit 20 is conventional. The audio amplifier 26 may be of any well-known type, but is normally so biased that it will be blocked. The indicator 34 is preferably an audible indicator such, for example, as a loud speaker, although, if desired, a visual indicator might be suitable for the purpose in certain instances.

While I have illustrated separate transmitting and receiving antennae, it is to be understood that in accordance with well-known practice a single antenna for both transmission and reception can be used, providing suitable blocking circuits are embodied in the system. The antenna may be of the unidirectional rotatable type, in which case the system will give an indication of direction as well as distance.

Figure 4:
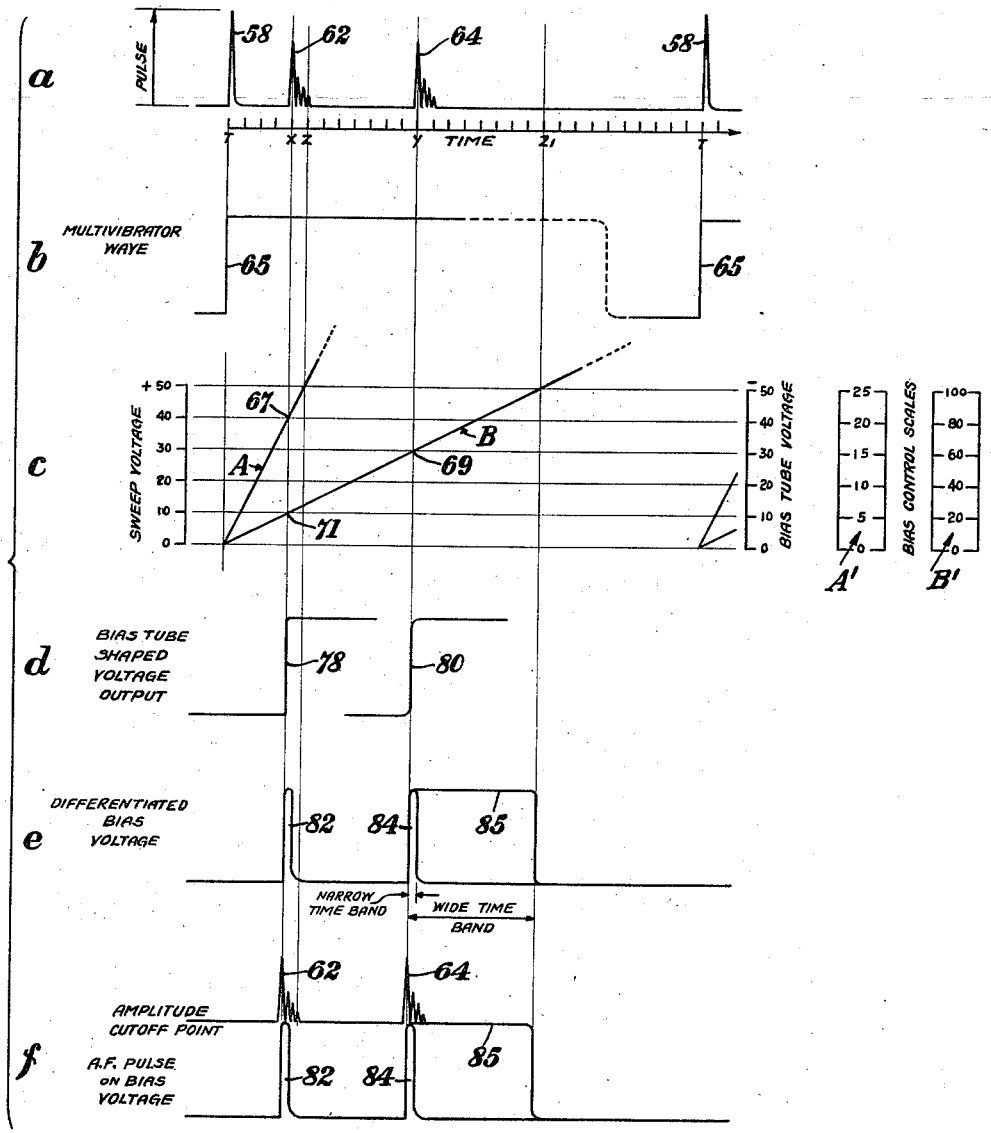
Fig. 4 illustrates, by means of correlated diagrams, the operation of the various elements forming my novel system.

The operation of my system will now be described by way of example. The pulse generator 13 will produce in a well-known manner a series of pulses 58 at some times $t$, Fig. 4($a$), which will be transmitted through transmitter 12 and antenna 14 and, at the same time, will also actuate a multivibrator 11 to produce a multivibrator sweep wave 65, Fig. 4($b$). The multivibrator 11 will, in turn, trigger a controlled sweep generator 10 to produce some characteristic wave whose voltage will increase with time. The type of wave produced by the sweep generator 10 can be varied in any suitable well-known manner and, for the purposes of the present invention, it is preferred that the sweep generator 10 be designed to produce either a relatively steep voltage wave A or an oblique voltage wave B, such as illustrated in Fig. 4($c$). For the purposes of the present invention only a portion of the voltage wave produced by the sweep generator is used, depending upon the range of the transmitter and receiver. This voltage range illustrated as being 50 volts, by way of example, in Fig. 4($c$) is applied to the biasing circuit 16, illustrated in detail in Fig. 2. Specifically, the voltage wave is applied to the grid 40 of a triode 36 which is controllably biased within the same range as the desired applied sweep voltage by a bottery or other source of power 48 controlled by a potentiometer 50. The operation of this biasing circuit will be clear to those skilled in this art. If, for example, the potentiometer 50 is set to provide a bias of $-50$ volts, the tube 36 will not become conductive within the desired range of the receiver, since the applied sweep voltage will not rise above 50 volts. If, on the other hand, the biasing voltage is set for $-40$ volts the tube will become conductive as soon as the applied sweep voltage is greater than the applied bias.

When the tube 36 becomes conductive, the point, with respect to time, being determined by the setting of the potentiometer 50, a voltage wave of constant amplitude will be produced which, after passing through the shaping circuit 20 will have a shape such as shown, for example, in Fig. 4($d$). The width of this new pulse will be determined by the setting of the differentiating circuit 22, illustrated in Fig. 3, and, after passing through the differentiating circuit 22, the voltage wave shown in Fig. 4($e$) will be applied to the blocked audio amplifier 26. In accordance with the present invention the value of the differentiated voltage wave which is applied to the amplifier 26 is slightly less than the voltage necessary to unblock the amplifier, the value being so chosen that if a signal from the receiver 32 is applied to the amplifier at the same time that the voltage pulse is applied thereto from the differentiating circuit 22, the amplifier will become conductive and the indicator 34 will indicate the reception of such signal. If, however, no signal is received when the voltage pulse is applied to the audio amplifier, there will be no indication, and likewise the reception of a signal without the application of the voltage pulse will give no indication.

The specific operation of the system just described will, it is believed, now be apparent to those skilled in this art. If, for example, the sweep generator 10 produces a voltage curve A covering a time $z$ from the time $t$ of the initiation of the pulse 58, which time period $t—z$ corresponds to a range of say 25 miles and, if a reflected pulse 62 is received at a time $x$, this received pulse will only become audible on the indicator 34 if the bias voltage on the tube 36 has a value of less than 40 volts, which is the sweep voltage value at point 67 corresponding to the time point $x$. Assuming the bias voltage as being set at just below 40 volts, the elapsed time $t—x$ at which the tube 36 will become conductive can be measured as distance on the scale A' of the potentiometer arm 18 and, in the present example corresponds to a distance of 20 miles. As soon as the tube 36 becomes conductive it will produce a wave which after shaping in shaping circuit 20 will have the form indicated at 78. In passing through the differentiating circuit 22 the wave will be narrowed to a pulse 82 which is applied to the audio amplifier. Accordingly, if an indication is given on the indicator 34 at the time $x$ corresponding to a setting of 20 miles on the potentiometer knob indicator scale A', this means that the object 28 producing the reflected signal 62 is 20 miles away, since the audio amplifier 26 will be energized to produce the indication by the simultaneous reception of the voltage pulse 82 and the signal 62.

If, on the other hand, the sweep generator were producing the voltage wave B, Fig. 4($c$), covering a time period of at least $t—z_1$ corresponding to a range of 100 miles, the reflected signal 62 at time $x$ would correspond to a sweep voltage of only 10 volts, point 71 on wave B, which on the corresponding potentiometer scale B' would still, however, indicate a distance of 20 miles. However, a reflected pulse 64 received at a time $y$ would correspond to a sweep voltage of 30 volts, point 69 on the voltage curve B, which, balanced by a bias voltage of slightly less than 30 volts would give an indication of 60 miles on potentiometer scale B'.

The operation of the variable differentiating circuit may be illustrated as shown in Fig. 4($f$) in connection with the reception of the signal 64. If, for example, the biasing potential is set at 30 volts but the differentiating circuit is set to produce a wide pulse 85 covering the range of reception, the indicator 34 would respond to any received pulse within the distance range of 60 to 100 miles. This results from the fact that the wide pulse 85 is applied to the amplifier 26 rather than the pulse 84 having a narrow time band. This variation in the use of the invention is of particular value for standby purposes. For example, a ship might be familiar with all craft within a 60-mile range but would be desirious of detecting any approaching craft beyond that distance. If the bias control, in this case, is set for 30 volts and the differentiating circuit is set to produce the broad pulse 85, any vessel or other object coming within the range of the receiver above 60 miles would give an indication such as a buzz on a loud speaker without the necessity of some one constantly operating the indicating system. When the buzz had once been received, by operating the differentiating circuit to narrow the time band and by adjusting the potentiometer 50 the exact position of the approaching object could then be accurately determined. Obviously, of course, the minimum range can be set as desired, since the differentiating circuit always operates to control the trailing edge of the voltage pulse which may be made to broaden the reception over any desired range.

The flexibility of the system is increased by providing two types of voltage sweeps, as indicated. For most purposes, it will probably be desirable to use a sweep such as sweep B, to cover as much distance as possible. However, if a vessel is near a predetermined object, such as an island, and it is only desirable to keep a close check on possible objects between the vessel and the island, it may be desirable to confine the range of reception to a relatively small distance in order to exclude undesired signals. In this event, a different voltage sweep such as sweep A will be more appropriate.

Various changes in the details of this invention, as well as possible other applications of my system, will be apparent to those skilled in this art. For example, while it may be preferable to control the blocking and unblocking of the audio amplifier, it is possible to control the blocking or unblocking of earlier stages of the receiver, or even of the indicator itself. Also, instead of using a predetermined voltage sweep with a variable bias, one might use a fixed bias with a controllable voltage sweep. The shaping circuit 20 is not necessary for the operation of this system, but is desirable as it produces more accurate results. The manner in which a voltage increasing with time is produced or initiated by the transmitted pulse is unimportant with respect to the operation of the present system and while I have indicated the use of a multivibrator triggering a sweep generator, other equivalent and well-known means can be used. In the limited sense illustrated and described the invention is of particular application in the detection of objects by the reception of reflected signals. In the broader sense, however, the invention is applicable to any system in which it is desired to measure the time between the receiving of a signal and its initiation from a distant source and, moreover, the invention provides a novel means for controllably unblocking a receiver or amplifier.

Accordingly, I do not wish to confine this invention except as may be required by the claims which follow:

What I claim is:

1. A distance indicating system comprising means for generating a pulse of energy, a transmitter for transmitting said pulse toward an object, means triggered by the generation of the pulse for generating a sweep voltage linearly increasing with time whereby the value of said sweep voltage is a measure of the time elapsed from the initiation of said pulse, a receiver at the same location as said transmitter for receiving the signal reflected from said object, normally blocked amplifying means receiving the output of said receiver, and a means operated in accordance with a selected bias voltage together with said sweep voltage increasing with time for impressing a debiasing voltage on said amplifying means at a controllable predetermined time after the transmission of said pulse, said debiasing voltage having a value slightly less than required for unblocking said amplifying means whereby said amplifying means will be unblocked upon the simultaneous reception of a reflected signal and the impressing of said debiasing control voltage, and the timing of said debiasing voltage will be a measure of the distance of said object from said receiver.

2. The combination according to claim 1, in combination with means triggered by the generation of the pulse for generating a sweep voltage increasing with time, whereby the value of said sweep voltage is a measure of the time elapsed from the initiation of said pulse, and in which said controllable voltage-impressing means includes means operated in accordance with a selected generated voltage.

3. The combination according to claim 1, in combination with and in which said controllable voltage-impressing means includes a vacuum tube having a grid, cathode and anode, means connecting said grid to said voltage generating means, means for connecting the output of said tube to said amplifying means, and controllable means for varying the bias on said tube.

4. The combination according to claim 1, in combination with and in which said controllable voltage-impressing means includes a vacuum tube having a grid, cathode and anode, means connecting said grid to said voltage generating means, means for connecting the output of said tube to said amplifying means, and controllable means for varying the bias on said tube, in combination with means connected with said receiver for indicating the reception of the reflected signal.

5. In combination, means for generating a pulse of energy, means triggered by said pulse for generating a voltage increasing with time, whereby the value of said generated voltage is a measure of the time elapsed from the generation of the pulse, a normally blocked amplifier, a vacuum tube having a grid, cathode and anode, means for exciting the grid of said tube by said voltage, means for applying a series of predetermined biasing potentials to said tube whereby whenever the biasing potential is greater than the exciting voltage said tube becomes non-conducting, means for connecting the output of said tube to said amplifier, said tube having an output voltage which is slightly less than the required voltage for unblocking said amplifier, whereby said amplifier will operate upon the simultaneous application of said output voltage and a received signal, and a differentiating circuit intermediate said tube and amplifier for confining the output voltage to a narrow pulse timed by the relationship between the generated voltage and the biasing potential, whereby the value of the predetermined applied biasing potential at the time the amplifier becomes operative is a measure of the time elapsed between the generation of the pulse and the reception of the signal.

6. In a distance indicating system of the type in which a generated pulse wave is transmitted from a transmitter toward an object, and the reflected signal is received at a receiver at the same location as the transmitter, the combination of a normally blocked amplifier connected to said receiver, an indicator operatively connected to said amplifier, a sweep generator triggered by a generated pulse, whereby the value of the sweep voltage bears a definite time relationship to the triggering pulse, and a bias control circuit connected to said amplifier for applying a voltage thereto, said voltage being slightly less than required for unblocking the amplifier, said bias control circuit comprising a vacuum tube having an anode, a grid and a cathode, means for connecting said anode to said amplifier, means for connecting said grid to the output of said sweep generator, and means for applying a variable voltage bias to said tube, said bias having a voltage range substantially equal and opposite to the applied output voltage range of said sweep generator, whereby control of said bias voltage controls the time of the output of said tube relatively to said triggering pulse, application of voltage to said amplifier, and the indication of a reflected signal.

7. The combination according to claim 6, in which said variable voltage bias means includes a potentiometer the setting of which has a time relationship with the generated and transmitted pulse.

8. The combination according to claim 6, in combination with a variable differentiating circuit intermediate said anode and said amplifier for varying the width of the time band of the output voltage pulse applied from said tube to said amplifier.

9. In a distance indicating system of the type in which a generated pulse wave is transmitted from a transmitter toward an object, and the reflected signal is received at a receiver at the same location as the transmitter, the combination of a normally blocked amplifier connected to said receiver, an indicator operatively connected to said amplifier, means triggered by a generated pulse for generating a voltage increasing with time, whereby the value of such voltage is a measure of the time elapsed from the generation and transmission of the pulse wave, a triode, means for exciting the grid of said triode by said voltage, means for applying a variable biasing potential to said triode, whereby, whenever the biasing potential is greater than said applied voltage, said triode is non-conducting, means connecting the anode of said triode to said amplifier, said triode having an output voltage which is slightly less than the required voltage for unblocking said amplifier, whereby the additional voltage on said amplifier caused by a received signal will unblock the amplifier to energize said indicator whenever said triode is conducting, and a differentiating circuit intermediate said triode and said amplifier for confining the triode output voltage to a narrow pulse whose timed position is controlled by the value of said biasing potential, whereby, whenever the energization of said indicator by a signal results from a predetermined biasing potential, the value of said biasing potential is a measure of the elapsed time of said received signal from the transmitted pulse wave and of the distance of the reflecting object from the transmitter.

10. A distance measuring system comprising means to transmit pulses of energy toward an object, means to receive and indicate reception of a signal resulting from the reception of a pulse from said object, means to control the reception indication of said signal for a given time interval, said last-named means being adjustable to vary the delay of said given time interval with respect to the transmission of said pulse until said interval coincides with the reception of said signal, whereby the delay of said given time interval will be a measure of the distance of said object from the location of the system, and means for making the adjustment of the duration of said time interval large for determining the presence of said object within a given range and for making the adjustment small to effect a vernier measurement of the distance of said object.

WILLIAM F. HOISINGTON.

REFERENCES CITED

The following references are of record in the file of this patent:

UNITED STATES PATENTS

| Number | Name | Date |
|---|---|---|
| 2,012,837 | Tear | Aug. 27, 1935 |
| 2,167,492 | Sproule | July 25, 1939 |
| 1,924,174 | Wolf | Aug. 29, 1933 |
| 2,227,598 | Lyman | Jan. 7, 1941 |
| 2,207,048 | Campbell | July 9, 1940 |
| 2,355,363 | Christaldi | Aug. 8, 1944 |